United States Patent
Tseng et al.

(10) Patent No.: US 8,570,848 B2
(45) Date of Patent: Oct. 29, 2013

(54) OPTICAL ACCESSING SYSTEM AND METHOD FOR CONTROLLING DECODING STRATEGY

(75) Inventors: Lu Chia Tseng, Hsin Pu Town, Hsin Chu County (TW); Sih-Kai Wang, Tainan (TW); Zhi-Hsin Lin, Chu Pei (TW)

(73) Assignee: Sunplus Technology Co., Ltd., Hsin-Chu (TW)

( * ) Notice: Subject to any disclaimer, the term of this patent is extended or adjusted under 35 U.S.C. 154(b) by 433 days.

(21) Appl. No.: 12/707,303

(22) Filed: Feb. 17, 2010

(65) Prior Publication Data

US 2010/0208561 A1  Aug. 19, 2010

(30) Foreign Application Priority Data

Feb. 18, 2009  (TW) ............................... 98105061 A

(51) Int. Cl.
*G11B 7/00* (2006.01)
(52) U.S. Cl.
USPC ...................................... 369/53.31
(58) Field of Classification Search
None
See application file for complete search history.

(56) References Cited

U.S. PATENT DOCUMENTS

| | | | |
|---|---|---|---|
| 7,916,594 B2 * | 3/2011 | Yang | 369/53.16 |
| 2002/0110071 A1 * | 8/2002 | Oki et al. | 369/59.24 |
| 2004/0130982 A1 * | 7/2004 | Lee et al. | 369/44.32 |
| 2005/0078580 A1 * | 4/2005 | Kochale et al. | 369/53.15 |
| 2005/0265191 A1 * | 12/2005 | Hwang et al. | 369/53.15 |
| 2006/0002266 A1 * | 1/2006 | Yokoyama et al. | 369/53.15 |
| 2006/0146675 A1 * | 7/2006 | Shin | 369/53.17 |

* cited by examiner

*Primary Examiner* — Joseph Haley
*Assistant Examiner* — Emily Frank
(74) *Attorney, Agent, or Firm* — Muncy, Geissler, Olds & Lowe, PLLC

(57) ABSTRACT

An optical storage system includes an optical pick-up head for receiving and transforming an optical signal into an electric signal; a pre-amplifier for receiving the electric signal and outputting a RF signal and a position error signal; a data and timing recovery unit for receiving the RF signal and generating a modulated signal and a clock signal; an error correction unit for generating a data signal according to the modulation signal and the clock signal; a defect signal generator for receiving the RF signal and generating a defect signal according to the RF signal, wherein the defect signal is enabled when the RF signal has a defect; and an error correction controller for receiving the defect signal and generating an error correction control signal according to the defect signal, wherein the error correction unit further receives the error correction control signal and adjusts the decoding strategy of the error correction unit according to the error correction control signal.

12 Claims, 3 Drawing Sheets

OPTICAL ACCESSING SYSTEM AND METHOD FOR CONTROLLING DECODING STRATEGY

This application claims priority of No. 098105061 097136794 filed in Taiwan R.O.C. on Feb. 18, 2009 under 35 USC 119, the entire content of which is hereby incorporated by reference.

BACKGROUND OF THE INVENTION

1. Field of Invention

The present invention relates in general to an optical storage system, and more particularly to an optical storage system using defect signal characteristics to immediately correct a decoding strategy and parameters of a servo controller, and to a method for the optical storage system to control its error correction.

2. Related Art

FIG. 1 is a block diagram showing a conventional optical storage system. As shown in FIG. 1, a conventional optical storage system 10 (such as a CD-ROM drive) includes an optical pick-up head 11, a pre-amplifier 12, a data and timing recovery unit 13, an error correction unit 14, a defect signal generator 15, a servo controller 16, a motor driver 17, and a buffer memory 18. When the optical storage system 10 reads data stored in an optical storage medium, the optical pick-up head 11 first transforms a laser ray reflected by the optical storage medium into an electric signal. Afterwards, the pre-amplifier 12 amplifies the electric signal to generate a radio frequency (RF) signal and a position error signal (such as a tracking error signal or a focus error signal). The defect signal generator 15 generates a defect signal DS according to the RF signal. The data and timing recovery unit 13 generates a modulated signal and a clock signal PLCK according to the RF signal and the defect signal DS. The modulated signal may be EFM, EFM+ or 17PP based on different optical storage media. The error correction unit 14 receives the modulated signal and the clock signal PLCK and corrects errors according to a predetermined decoding strategy so as to output corrected data. The servo controller 16 receives the defect signal DS from the defect signal generator 15 and the position error signal from the pre-amplifier 12 to generate a servo control signal to the motor driver 17. The motor driver 17 controls the move of the optical pick-up head 11. The buffer memory 18 is used for storing data temporarily.

However, when poor quality of electric signals generated by the optical pick-up head 11 occurs as a result of physical defects existing in the optical storage medium itself or other factors, a decoder cannot successfully decode correct information, which in turn leads to a decoding error. Therefore, the conventional optical storage system 10 includes an error correction unit 14 to reduce chances of decoding errors by improving system parameters. In other words, the error correction unit 14 decodes and corrects according to the modulated signal and the clock signal PLCK outputted by the data and timing recovery unit 13 so as to output correct information.

As disclosed by U.S. Pat. No. 7,106,679, a conventional error correction system adjusts the parameters of the servo controller 16, the parameters of a read channel, or the decoding strategy of the decoder to reduce decoding errors after the error correction unit 14 has decoding errors. Nevertheless, this afterwit method only changes the system parameters or the decoding strategy after a decoding error occurs rather than make a corresponding adjustment immediately when a factor likely to cause a decoding error appears.

SUMMARY OF THE INVENTION

It is therefore an objective of the present invention to provide an optical storage system which uses an error correction controller to analyze a defect signal, and, when characteristics of the defect signal satisfy predetermined conditions, generates an error correction control signal to adjust parameters of a servo controller or a decoding strategy of a decoder.

To achieve the above-identified or other objectives, the present invention provides an optical storage system including an optical pick-up head for receiving an optical signal to transform it into an electric signal; a pre-amplifier for receiving the electric signal and then outputting a RF signal and a position error signal; a data and timing recovery unit for receiving the RF signal and generating a modulated signal and a clock signal; an error correction unit for receiving the modulated signal and the clock signal to generate a data signal; a defect signal generator for receiving the RF signal to generate a defect signal according to the RF signal, wherein the defect signal is enabled when the RF signal has a defect; a servo controller for receiving the position error signal from the pre-amplifier and the defect signal to generate a servo control signal; and an error correction controller for generating an error correction control signal according to characteristics of the defect signal, wherein the error correction unit further receives the error correction control signal and adjusts the decoding strategy of the error correction unit according to the error correction control signal.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention.

DETAILED DESCRIPTION OF THE INVENTION

The present invention will be apparent from the following detailed description, which proceeds with reference to the accompanying drawings, wherein the same references relate to the same elements.

The conventional error correction system only takes action after a decoding error occurs, and therefore cannot avoid decoding errors beforehand. Actually, some factors prone to cause a decoding error can be detected before a decoder has an error, such as a defect (a scrape, defacement, or the like) on the surface of an optical storage medium. When any of these defects is detected, system parameters can be adjusted in advance to prevent a decoding error from happening. An optical storage system of the present invention modifies its system parameters in advance according to the characteristics of a defect signal, e.g. a width, number or density of the defect signal, to improve accuracy of error correction.

Figure 1:
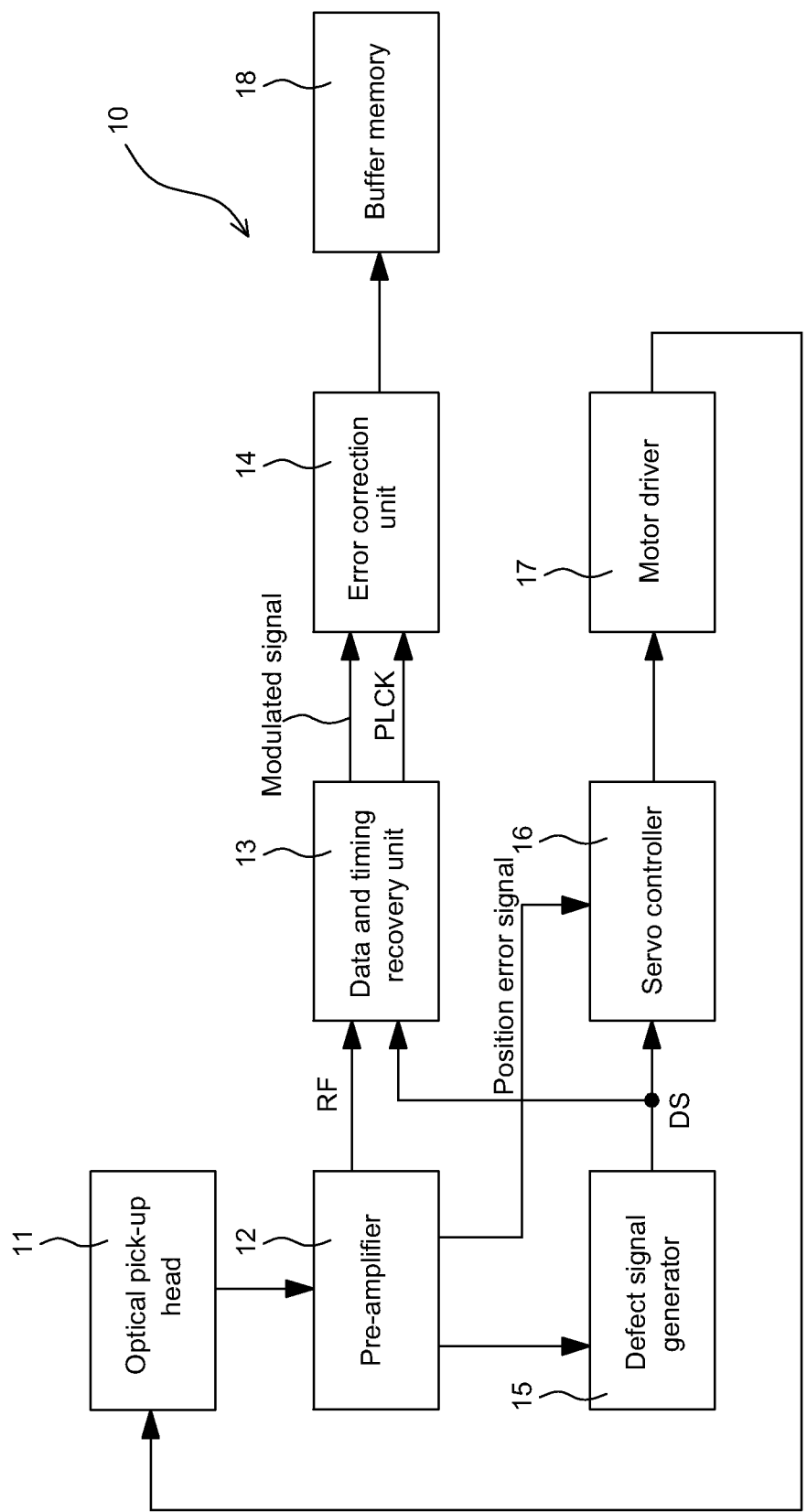
FIG. 1 is a block diagram showing a conventional optical storage system.
Figure 2:
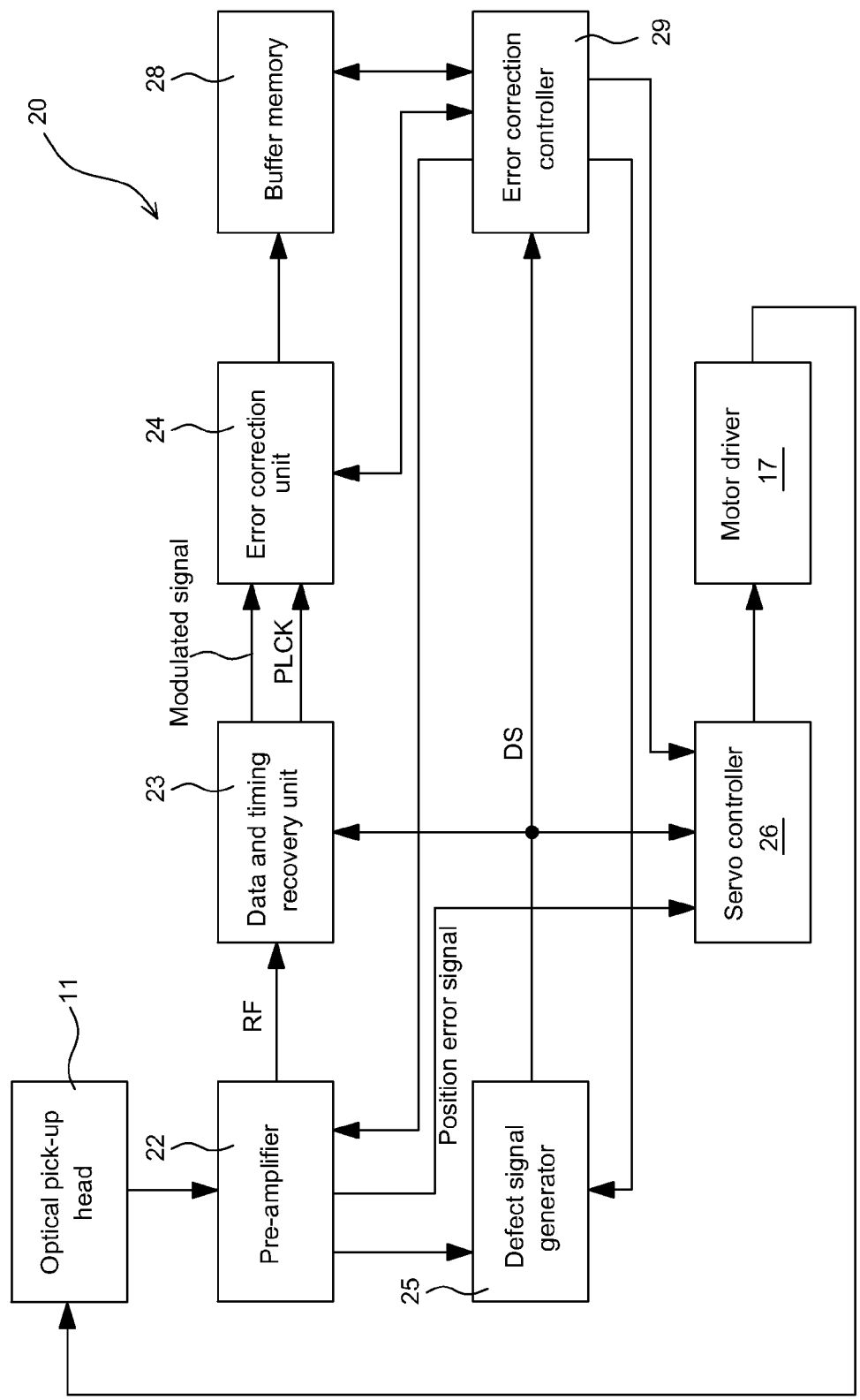
FIG. 2 is a block diagram showing an optical storage system of the present invention.

FIG. 2 is a block diagram of the optical storage system of the present invention. As shown, an optical storage system 20 of the present invention, such as a CD-ROM drive, includes an optical pick-up head 11, a pre-amplifier 22, a data and timing recovery unit 23, an error correction unit 24, a defect signal generator 25, a servo controller 26, a motor driver 17, and a buffer memory 28, and further includes an error correction controller 29. Since the actions of the optical pick-up head 11, the pre-amplifier 22, the data and timing recovery unit 23, the error correction unit 24, the defect signal generator 25, the servo controller 26, the motor driver 17, and the buffer memory 28 are all the same as those described in the prior art, their respective descriptions are omitted herein.

The error correction controller 29 receives a defect signal DS generated by the defect signal generator 25 and then analyzes characteristics of the defect signal DS. When the characteristics of the defect signal DS conform to certain predetermined conditions, the error correction controller 29 generates an error correction control signal to adjust the parameters of the servo controller 26 or the decoding strategy of the error correction unit 24. For example, the error correction controller 29 analyzes relevant characteristics such as a width, a number and a density of the defect signal DS and determines whether the width of the defect signal DS exceeds a predetermined width, or whether other characteristics exceed other predetermined conditions. When the defect signal DS conforms to one of the predetermined conditions, the error correction controller 29 outputs an error correction control signal to adjust the parameters of the servo controller 26 or the decoding strategy of the error correction unit 24. For example, according to the error correction control signal the optical storage system determines either PI (parity of the inner code) priority or PO (parity of the outer code) priority should proceed, adjusts the number of times of iteration, or sets up erasures in the error correction unit 24, and adjusts the gain or bandwidth of the servo controller 26. Hence, compared with the conventional servo controller 26, which only adjusts the servo control signal according to the defect signal DS and the position error signal, the servo controller 26 of the present invention adjusts the servo control signal by further reference to the error correction control signal from the error correction controller 29.

The error correction controller 29 analyzes defect signals. It can analyze values of the characteristics such as the number, the width or the density of the defect signal DS. For example, the error correction controller 29 may include two counters to count the width and the number of the defect signal DS, e.g. a defect width counter and a defect number counter (not shown). When the defect signal DS is enabled (as on a high level), the defect width counter adds 1 to count the width of the defect signal DS every reference clock cycle. When the defect signal DS changes from a high level to a low level, the defect number counter adds 1 to count the number of the defects that occur. At the same time, the error correction controller 29 may set up a time cycle and divide an accumulated value in the defect number counter with a time unit value after each time cycle elapses to obtain a defect density. When the value in the defect width counter exceeds a predetermined threshold value, a defect width threshold flag is generated to inform the system of the exceeding-threshold-value defect, which means a long defect has occurred. Therefore, the error correction controller 29 can correct the system parameters immediately according to the analyzed defect signal characteristics so that the accuracy of error correction is improved.

Figure 3:
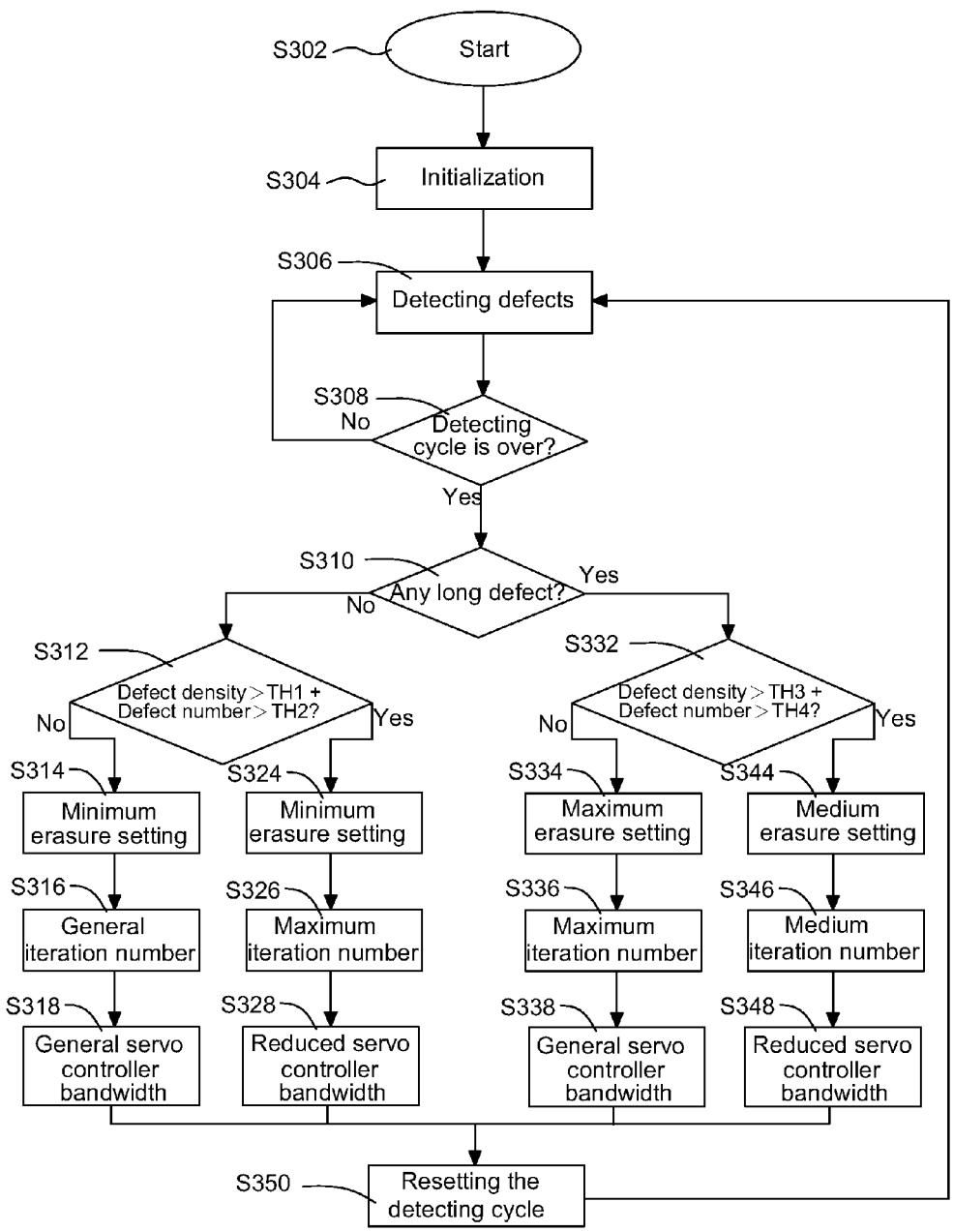
FIG. 3 shows a control flowchart of an error correction controller according to an embodiment of the present invention.

FIG. 3 is a control flowchart showing a method for controlling a decoding strategy of an optical storage system according to an embodiment of the present invention. Different timings at which the error correction controller 29 adjusts the system parameters according to the defect signal characteristics are described in detail by reference to FIG. 3.

After the flow begins (step S302), first an initializing process proceeds (step S304). During the initialization a detecting cycle is set up to keep count of the information on defect characteristics within the detecting cycle. Simultaneously, the system also sets up some threshold values, including a first density threshold value TH1, a first number threshold value TH2, a second density threshold value TH3, and a second number threshold value TH4, so that whether a defect density or a defect number exceeds the set threshold values can be determined. Furthermore, during the initialization, the error correction controller 29 also sets up the decoding strategy and the parameters of the servo controller as a minimum erasure setting, a general iteration number and a general servo controller bandwidth. An erasure is used to designate the position of an error within a data sector, while an iteration number represents a number of times the error correction unit iterates to decode.

After completing the initialization, the optical storage system begins detecting characteristics of defect signal on a disk (step S306). When detecting defect characteristic information, a detecting cycle is the time unit (step S308). After completing the detecting cycle, the error correction controller analyzes the defect characteristic information gathered within the detecting cycle and changes the parameters of the error correction unit and the servo controller accordingly. The following analyses are made based on decoding strategies defined by several different characteristics such as long defect, defect density and defect number.

First, it is determined whether a long defect has occurred (step S310), and then whether the defect density is larger than the first density threshold value TH1 and the defect number is larger than the first number threshold value TH2 (step S312) are determined, or whether the defect density is larger than the second density threshold value TH3 and the defect number is larger than the second number threshold value TH4 (step S332) are determined. Several situations proceed according to said judgments.

Situation 1 (steps S314-S318): When no long defect occurs, and the defect density is smaller than or equal to the first density threshold value TH1, or the defect number is smaller than or equal to the first number threshold value TH2, the decoding strategy and the parameters of the servo controller are set as a minimum erasure setting, a general iteration number, and a general servo controller bandwidth.

Situation 2 (steps S324-S328): When no long defect occurs, the defect density is larger than the first density threshold value TH1, and simultaneously the defect number is larger than the first number threshold value TH2, the decoding strategy and the parameters of the servo controller are set as the minimum erasure setting, a maximum iteration number, and a reduced servo controller bandwidth.

Situation 3 (steps S334-S338): When a long defect occurs, and the defect density is smaller than or equal to the second density threshold value TH3, or the defect number is smaller than or equal to the second number threshold value TH4, the decoding strategy and the parameters of the servo controller are set as a maximum erasure setting, the maximum iteration number, and the general servo controller bandwidth.

Situation 4 (steps S344-S348): When a long defect occurs, the defect density is larger than the second density threshold value TH3, and simultaneously the defect number is larger than the second number threshold value TH4, the decoding strategy and the parameters of the servo controller are set as a medium erasure setting, a medium iteration number, and the reduced servo controller bandwidth.

Hence, the optical storage system in the present invention uses characteristics of defect signal to immediately adjust the decoding strategy and the parameters of the servo controller rather than wait until a decoding error happens and then correct the decoding strategy and the parameters of the servo controller. As a result, the accuracy of error correction in the optical storage system in the present invention is significantly improved.

While the invention has been described by way of examples and in terms of preferred embodiments, it is to be understood that the invention is not limited thereto. To the contrary, it is intended to cover various modifications. Therefore, the scope of the appended claims should be accorded the broadest interpretation so as to encompass all such modifications.

What is claimed is:

1. An optical storage system for reading data, comprising:
   an optical pick-up head, for receiving and transforming an optical signal into an electric signal;
   a pre-amplifier, for receiving the electric signal and then outputting a radio frequency (RF) signal and a position error signal;
   a data and timing recovery unit, for receiving the RF signal to generate a modulated signal and a clock signal;
   an error correction unit, for receiving the modulated signal and the clock signal to generate a data signal;
   a defect signal generator, for generating a defect signal according to the RF signal, wherein the defect signal is enabled when the RF signal has a defect;
   a servo controller, for receiving the position error signal and the defect signal and generating a servo control signal; and
   an error correction controller, coupled to the defect signal generator, for generating an error correction control signal according to characteristics of the defect signal,
   wherein the error correction unit is further coupled to the error correction controller so that a decoding strategy of the error correction unit is adjusted according to the error correction control signal.

2. The optical storage system as claimed in claim 1, wherein the servo controller further receives the error correction control signal from the error correction controller to adjust a servo controller bandwidth.

3. The optical storage system as claimed in claim 1, wherein the characteristics of the defect signal comprise a width, a number and a density of the defect signal.

4. The optical storage system as claimed in claim 3, wherein the error correction controller determines whether the width of the defect signal exceeds a width threshold value, a defect density or a defect number during a detecting cycle, wherein when the width of the defect signal detected during the detecting cycle exceed the predetermined value, the defect is a long defect.

5. The optical storage system as claimed in claim 4, wherein when the error correction controller does not detect the long defect, and the defect density is smaller than or equal to a first density threshold value, or the defect number is smaller than or equal to a first number threshold value, the decoding strategy and corresponding parameters of the servo controller are set as a minimum erasure setting, a general iteration number, and a general servo controller bandwidth.

6. The optical storage system as claimed in claim 5, wherein when the error correction controller does not detect the long defect, the defect density is larger than the first density threshold value, and simultaneously the defect number is larger than the first number threshold value, the decoding strategy and the corresponding parameters of the servo controller are set as the minimum erasure setting, a maximum iteration number, and a reduced servo controller bandwidth.

7. The optical storage system as claimed in claim 4, wherein when the error correction controller detects the long defect, and the defect density is smaller than or equal to a second density threshold value, or the defect number is smaller than or equal to a second number threshold value, the decoding strategy and corresponding parameters of the servo controller are set as a maximum erasure setting, a maximum iteration number, and the general servo controller bandwidth.

8. The optical storage system as claimed in claim 7, wherein when the error correction controller detects the long defect, the defect density is larger than the second density threshold value, and simultaneously the defect number is larger than the second number threshold value, the decoding strategy and the corresponding parameters of the servo controller are set as a medium erasure setting, a medium iteration number, and a reduced servo controller bandwidth.

9. A method for controlling a decoding strategy applied in an optical storage system, comprising following steps:
   performing an initializing process to set a detecting cycle, a first density threshold value, a second density threshold value, a first number threshold value, and a second number threshold value and set the decoding strategy and corresponding parameters from a servo controller as a minimum erasure setting, a general iteration number, and a general servo controller bandwidth;
   detecting characteristics of a defect signal on an optical disk for reading data, wherein the characteristics of the defect signal on the optical disk are detected during the detecting cycle to generate a defect width, a defect density, and a defect number; and
   adjusting the decoding strategy according to the defect width, the defect density, and the defect number, wherein when the defect width of the defect signal detected during the detecting cycle does not exceed a predetermined value, and the defect density is smaller than or equal to the first density threshold value, or the defect number is smaller than or equal to the first number threshold value, the decoding strategy and the corresponding parameters of the servo controller are set as the minimum erasure setting, the general iteration number, and the general servo controller bandwidth.

10. The method for controlling the decoding strategy of the optical storage system as claimed in claim 9, wherein when the defect width of the defect signal detected within the detecting cycle does not exceed the predetermined value, the defect density is larger than the first density threshold value, and the defect number is larger than the first number threshold value simultaneously, the decoding strategy and the corresponding parameters of the servo controller are set as the minimum erasure setting, a maximum iteration number, and a reduced servo controller bandwidth.

11. The method for controlling the decoding strategy of the optical storage system as claimed in claim 9, wherein when the defect width of the defect signal detected during the detecting cycle exceeds the predetermined value, and the defect density is smaller than or equal to the second density threshold value, or the defect number is smaller than or equal to the second number threshold value, the decoding strategy and the corresponding parameters of the servo controller are set as a maximum erasure setting, a maximum iteration number, and the general servo controller bandwidth.

12. The method for controlling the decoding strategy of the optical storage system as claimed in claim 11, wherein when the defect width of the defect signal detected within the detecting cycle exceeds the predetermined value, the defect density exceeds the second density threshold value, and the defect number is larger than the second number threshold value simultaneously, the decoding strategy and the corresponding parameters of the servo controller are set as a medium erasure setting, a medium iteration number, and a reduced servo controller bandwidth.

* * * * *